US010891321B2

(12) United States Patent
Grabau et al.

(10) Patent No.: US 10,891,321 B2
(45) Date of Patent: Jan. 12, 2021

(54) SYSTEMS AND METHODS FOR PERFORMING A COMPUTER-IMPLEMENTED PRIOR ART SEARCH

(71) Applicant: American Chemical Society, Washington, DC (US)

(72) Inventors: Mark Ryan Grabau, Westerville, OH (US); John David Fleig, Hilliard, OH (US); Dmitrii Arkadyevich Polshakov, Columbus, OH (US); Jeffrey Michael Wilson, Upper Arlington, OH (US); Rodney Laroy Fulford, Reynoldsburg, OH (US); Yi Deng, Powell, OH (US); Philippe Yves Ayala, Columbus, OH (US); Donald Eugene Swartwout, Powell, OH (US); Christopher Ryan Gessner, Columbus, OH (US)

(73) Assignee: American Chemical Society, Washington, DC (US)

( * ) Notice: Subject to any disclaimer, the term of this patent is extended or adjusted under 35 U.S.C. 154(b) by 0 days.

(21) Appl. No.: 16/553,148

(22) Filed: Aug. 27, 2019

(65) Prior Publication Data
US 2020/0073879 A1    Mar. 5, 2020

Related U.S. Application Data

(60) Provisional application No. 62/723,959, filed on Aug. 28, 2018.

(51) Int. Cl.
*G06F 16/00* (2019.01)
*G06F 16/31* (2019.01)
(Continued)

(52) U.S. Cl.
CPC .......... *G06F 16/328* (2019.01); *G06F 16/335* (2019.01); *G06F 16/93* (2019.01); *G06F 17/16* (2013.01); *G06N 3/02* (2013.01)

(58) Field of Classification Search
CPC ........ G06F 16/24; G06F 16/43; G06F 16/903; G06F 16/951; G06F 16/134; G06F 16/22;
(Continued)

(56) References Cited

U.S. PATENT DOCUMENTS

2011/0093449 A1    4/2011  Belezon et al.
2012/0166414 A1*   6/2012  Decker ................ G06F 16/958
                                                    707/709
(Continued)

OTHER PUBLICATIONS

Kas Kasravi and Marie Risov, *Multivariate Patent Similarity Detection*, Proceedings of the 42nd Hawaii International Conference on System Science (2009), https://pdfs.semanticscholar.org/372f/2f7682e2c1acdf0f942f3862d465e73a1f68.pdf (8 pages).

*Primary Examiner* — Alexandra Y Bromell
(74) *Attorney, Agent, or Firm* — Finnegan, Henderson, Farabow, Garrett & Dunner, L.L.P.

(57) ABSTRACT

In some embodiments, a computer-implemented method for retrieving a similar document from a corpus of documents is provided. The method may include receiving a search document comprising a set of words; applying a first encoder to generate a first vector; applying a second encoder to generate a second vector; determining a first similarity between the first vector of the search document and the first vector of each document of the corpus of documents; determining a second similarity between the second vector of the search document and the second vector of each document of the corpus of documents; generating a first ranked list of documents based on the first similarity; generating a second ranked list of documents based on the second similarity; applying a voting algorithm to determine a score associated (Continued)

with each document; and outputting a third ranked list of documents based on the determined score.

11 Claims, 10 Drawing Sheets

(51) Int. Cl.
  *G06F 17/16* (2006.01)
  *G06F 16/335* (2019.01)
  *G06N 3/02* (2006.01)
  *G06F 16/93* (2019.01)
(58) Field of Classification Search
  CPC .......... G06F 16/31; G06F 16/41; G06F 16/61; G06F 16/71; G06F 16/81; G06F 16/901
  USPC ................................ 707/741, 758, 923, 937
  See application file for complete search history.

(56) References Cited

U.S. PATENT DOCUMENTS

| | | | |
|---|---|---|---|
| 2012/0296891 A1* | 11/2012 | Rangan | G06F 16/3347 707/722 |
| 2013/0013291 A1* | 1/2013 | Bullock | G06F 40/30 704/9 |
| 2017/0024384 A1* | 1/2017 | Kant | G06F 16/51 707/707 |
| 2018/0052929 A1* | 2/2018 | Liu | G06F 16/951 707/707 |

* cited by examiner

PRIOR ART SEARCH

Filter by:

| Target |
|---|
| US 0,000,001 |

| CPC |
|---|
| A61N 7/02 |

| Country |
|---|
| ✓ United States |
| China |
| Japan |

Sort by: Target

| Document | Score | Title | DOCDB Patent Family |
|---|---|---|---|
| US 9,999,991 | 0.94164 | SYSTEMS AND METHODS FOR... | 12345678 |
| US 9,999,992 | 0.56934 | METHODS FOR FABRICATING... | 98765432 |
| US 9,999,993 | 0.42364 | SYSTEMS AND METHODS FOR... | 22343222 |
| US 9,999,994 | 0.67538 | SYSTEMS FOR DETERMINING... | 11234212 |
| US 9,999,995 | 0.78543 | A SYSTEM FOR GENERATING... | 61345221 |
| US 9,999,996 | 0.78563 | SYSTEMS AND METHODS FOR... | 87685943 |

FIG. 4B

SYSTEMS AND METHODS FOR PERFORMING A COMPUTER-IMPLEMENTED PRIOR ART SEARCH

CROSS-REFERENCES TO RELATED APPLICATIONS

This application claims priority from U.S. Provisional Patent Application No. 62/723,959, filed Aug. 28, 2018, which is hereby incorporated by reference in its entirety.

BACKGROUND

Performing prior art searches is often cumbersome and inefficient. Methods of performing prior art searches suffer from long processing times, thereby causing backlogs and delays in the patent examining process. In addition, current computerized search tools require a human to input information at one or more steps. Inefficiencies in current search methods also stem from the difficulty of quantifying textual documents, yielding sub-optimal results.

Thus, there exists a need for systems and methods for efficiently and accurately identifying similar documents.

SUMMARY OF THE INVENTION

For some embodiments of the present invention, a computer-implemented method is provided for generating a document database.

In one embodiment, a computer implemented method for generating a document database is provided. The method may include receiving a document of a plurality of documents, the document comprising a set of words; applying a first encoder to the set of words to generate a first vector; applying a second encoder to the set of words to generate a second vector; indexing the document using the first vector and the second vector into a searchable index; and enabling searching for the document using the index.

In another embodiment, a method for retrieving a similar document from a corpus of documents is provided. The method may include: receiving a search document, the search document comprising a set of words; applying a first encoder to the set of words to generate a first vector; applying a second encoder to the set of words to generate a second vector; determining a first similarity between the first vector of the search document and the first vector of each document of the corpus of documents; determining a second similarity between the second vector of the search document and the second vector of each document of the corpus of documents; generating a first ranked list of documents in the corpus based on the first similarity; generating a second ranked list of documents in the corpus based on the second similarity; applying a voting algorithm to determine a score associated with each document based on a position of each document in its relative ranked list; and outputting a third ranked list of documents based on the determined score.

In another embodiment, a computer program product may include a non-transitory computer readable medium having a computer readable program embodied therein. The computer readable program, when executed on a computing device, may cause the computing device to: receive a search document, the search document comprising a set of words; apply a first encoder to the set of words to generate a first vector; apply a second encoder to the set of words to generate a second vector; determine a first similarity between the first vector of the search document and the first vector of each document of the corpus of documents; determine a second similarity between the second vector of the search document and the second vector of each document of the corpus of documents; generate a first ranked list of documents in the corpus based on the first similarity; generate a second ranked list of documents in the corpus based on the second similarity; apply a voting algorithm to determine a score associated with each document based on a position of each document in its relative ranked list; and output a third ranked list of documents based on the determined score.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 4B is another exemplary graphical user interface displaying prior art search results, in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Disclosed embodiments provide systems and methods for performing a computer-implemented prior art search. The disclosed systems and methods may be used to evaluate prior art and its similarities to one or more documents such as new patent applications. The disclosed systems and methods may provide increased accuracy over prior systems, which are inefficient and require human intervention at one or more steps.

In one embodiment, systems and methods consistent with the present disclosure may receive a patent application or other document as an input and output related prior art results and/or other related documents. Such systems and methods may be used, for example, to find prior art related to a newly submitted patent application. In other embodiments, the described systems and methods may be used to perform related art searches prior to submitting a patent application or may be used to assist in freedom-to-operate analyses.

The systems and methods described herein may be used by, for example, commercial, government, or academic entities, including but not limited to scientists, intellectual property professionals, legal professionals, business professionals, patent-office examiners, regulatory bodies, and academics. In an embodiment, the system may enable a user to perform a similarity search between published patent applications (or other documents) and a new patent application (or other document). In some embodiments, the system may output a document determined to be most similar to the inputted document or a list of similar documents ranked based on their similarity to the inputted document.

Figure 1:
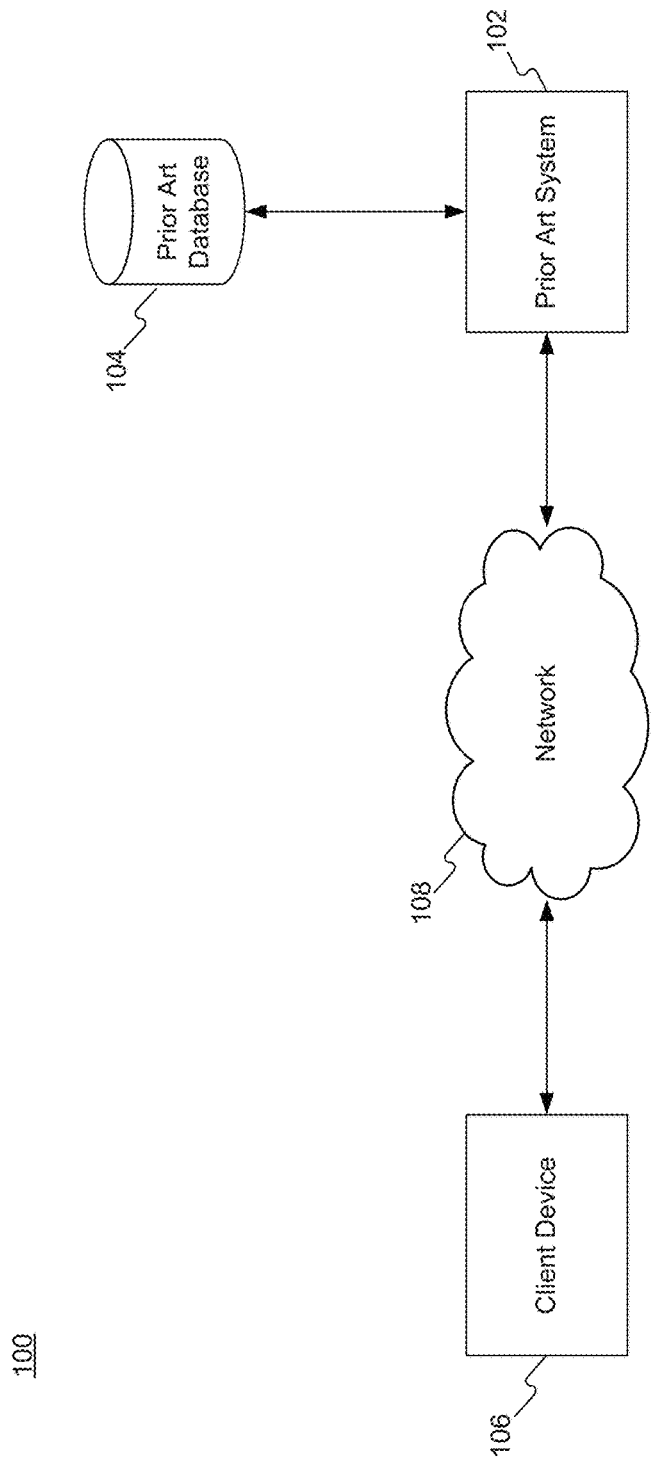
FIG. 1 is a block diagram of an exemplary system for maintaining a prior art database, in accordance with disclosed embodiments.

FIG. 1 depicts exemplary system 100 for maintaining a prior art database, consistent with disclosed embodiments. As shown, system 100 may include prior art system 102, prior art database 104, and client device 106. Components of system 100 may be connected to each other via network 108.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of prior art systems, prior art databases, client devices and/or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Prior art system 102 may include a computing device, a computer, a server, a server cluster, a plurality of server clusters, and/or a cloud service, consistent with disclosed embodiments. Prior art system 102 may include one or more memory units and one or more processors configured to perform operations consistent with disclosed embodiments. Prior art system 102 may include computing systems configured to generate, receive, retrieve, store, and/or provide data models and/or datasets, consistent with disclosed embodiments. Prior art system 102 may include computing systems configured to generate and train models, consistent with disclosed embodiments. Prior art system 102 may be configured to receive data from, retrieve data from, and/or transmit data to other components of system 100 and/or computing components outside system 100 (e.g., via network 108. Prior art system 102 is disclosed in greater detail below (in reference to FIG. 2A).

Prior art system 102 may include programs (e.g., scripts, functions, algorithms) to train, implement, store, receive, retrieve, and/or transmit one or more machine-learning models. Machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Selection may be configured to adjust model parameters during training. Model parameters may include weights, coefficients, offsets, or the like. Training may be supervised or unsupervised.

Prior art database 104 may be hosted on one or more servers, one or more clusters of servers, or one or more cloud services. Prior art database 104 may be connected to network 108 (connection not shown).

In some embodiments, prior art database 104 may include one or more databases configured to store data for use by system 100, consistent with disclosed embodiments. In some embodiments, prior art database may be configured to store datasets and/or one or more dataset indexes, consistent with disclosed embodiments. Prior art database 104 may include a cloud-based database (e.g., AMAZON WEB SERVICES RELATIONAL DATABASE SERVICE) or an on-premises database. Prior art database 104 may include datasets, model data (e.g., model parameters, training criteria, performance metrics, etc.), and/or other data, consistent with disclosed embodiments. Prior art database 104 may include data received from one or more components of system 100 and/or computing components outside system 100 (e.g., via network 108). In some embodiments, prior art database 104 may be a component of prior art system 102 (not shown).

In some embodiments, prior art database 104 may store information in a data structure, e.g., a graph structure. Prior art database 104 may be implemented using, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Client device 106 may include one or more memory units and one or more processors configured to perform operations consistent with disclosed embodiments. In some embodiments, client device 106 may include hardware, software, and/or firmware modules. Client device 106 may be a user device. Client device 106 may include a mobile device, a tablet, a personal computer, a terminal, a kiosk, a server, a server cluster, a cloud service, a storage device, a specialized device configured to perform methods according to disclosed embodiments, or the like.

At least one of prior art system 102, prior art database 104, or client device 106 may be connected to network 108. Network 108 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 108 may be connected to other networks (not depicted in FIG. 1) to connect the various system components to each other and/or to external systems or devices. In some embodiments, network 108 may be a secure network and require a password to access the network.

Figure 2A:
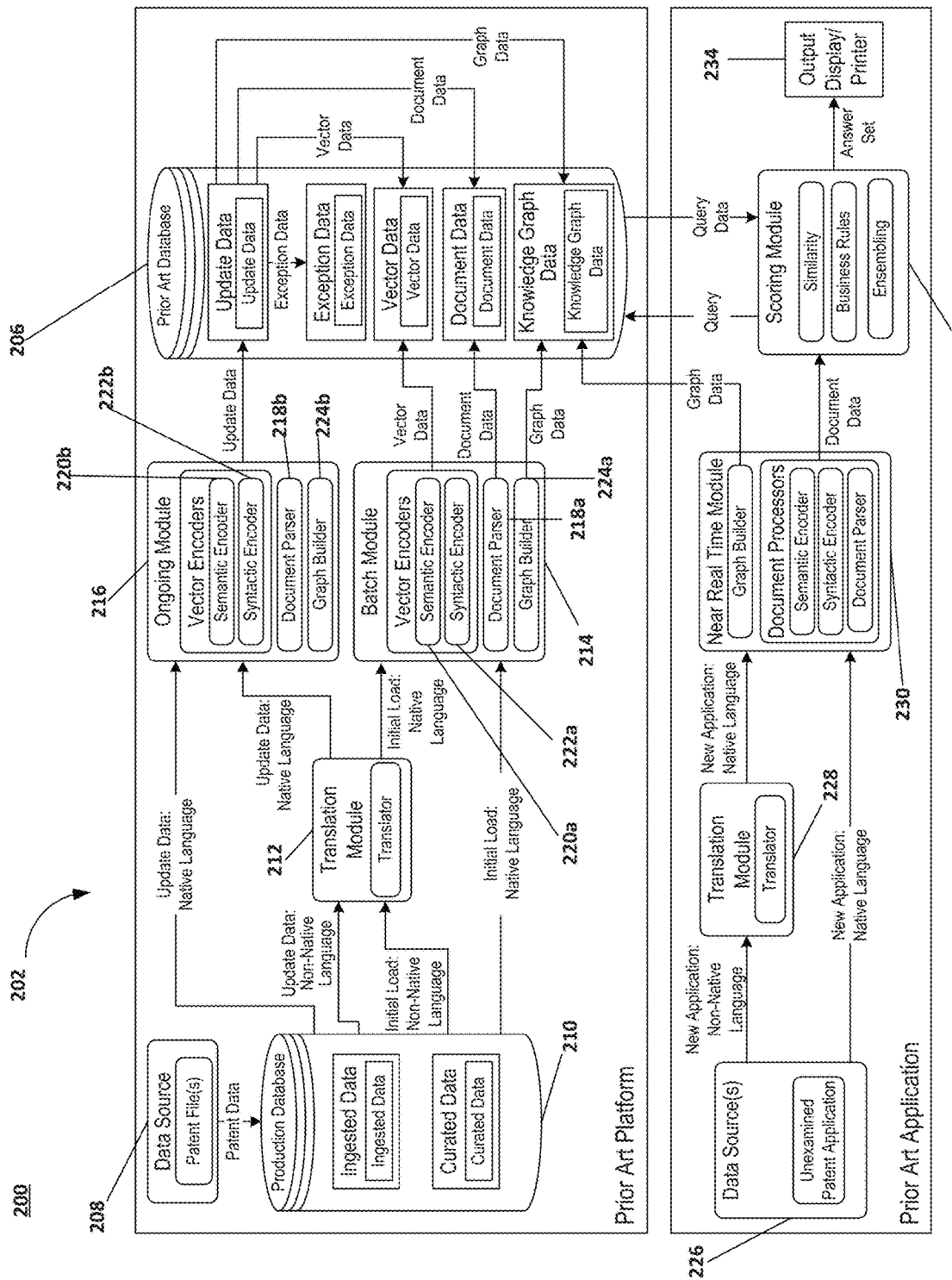
FIG. 2A is a process diagram of an exemplary system for searching a prior art database, in accordance with disclosed embodiments.

FIG. 2A depicts an exemplary configuration 200 of prior art system 102. As will be appreciated by one skilled in the art, the components and arrangement of components included in prior art system 102 may vary. For example, as compared to the depiction in FIG. 2A, prior art system 102 may include a larger or smaller number of processors, interfaces or I/O devices, or memory units. In addition, prior art system 102 may further include other components or devices not depicted that perform or assist in the performance of one or more processes consistent with the disclosed embodiments. The components and arrangements shown in FIG. 2A are not intended to limit the disclosed embodiments, as the components used to implement the disclosed processes and features may vary.

Processor 200 may comprise known computing processors, including a microprocessor. Processor 200 may constitute a single-core or multiple-core processor that executes parallel processes simultaneously. For example, processor 200 may be a single-core processor configured with virtual processing technologies. In some embodiments, processor 200 may use logical processors to simultaneously execute and control multiple processes. Processor 200 may implement virtual machine technologies, or other known technologies to provide the ability to execute, control, run, manipulate, store, etc., multiple software processes, applications, programs, etc. In another embodiment, processor 200 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 200 may execute various instructions stored in memory to perform various functions of the disclosed embodiments described in greater detail below. Processor 200 may be configured to execute functions written in one or more known programming languages.

The prior art system 102 may include two components: a prior art platform 202 and a prior art application 204. In some embodiments, prior art system 102 may include other arrangements of components, including additional components.

Prior art platform 202 may be configured to generate a prior art database 206 from one or more patent files received at a data source 208. Data source 208 may access one or more databases, third-party databases, web-scrapers, etc. to receive document files. Document files may be transmitted from data source 208 to a production database 210.

The production database 210 may store the files that have been ingested (Ingested Data) and files that have been indexed either manually by a human or automated via a machine (Curated Data). For example, the index may be based on one or more tags associated with the document. A tag may be related to the document contents, one or more key words contained in the document, or metadata associated with the document. Production database 210 may be the same as prior art database 104 or may be a separate database.

In some embodiments, if the ingested file is in a non-native language, a translation module 212 may translate the text of the document from the non-native language to the native language. In some embodiments, translation module 212 may retrieve, e.g., from a database, the native language version of the file. For example, translation module 212 may receive a file including a Chinese patent. Translation module 212 may parse the document to determine a patent number and use the patent number to query one or more third-party applications to retrieve a native-language counterpart application.

To populate prior art database 206 two modules may be executed: batch module 214 and ongoing module 216. The batch module 214 may process a corpus of files. For example, batch module 214 may be configured to execute an initial processing of files to the prior art database 206. In some embodiments, ongoing module 216 may process files received at data source 208 as part of a periodic (e.g., daily, weekly, monthly, etc.) update process. In some embodiments, ongoing module 216 may query prior art database 206 to determine whether a file already exists in the database. If the file does exist, ongoing module 216 may update information associated with the file in prior art database 206.

In some embodiments, the batch module 214 may include: a document parser 218a, a semantic encoder 220a, a syntactic encoder 222a, and a graph builder 224a. Ongoing module 216 may include a document parser 218b, a semantic encoder 220b, a syntactic encoder 222b, and a graph builder 224b. In some embodiments, identically-named components (e.g., document parser 218a and document parser 218b) may be implemented in identical ways. In other embodiments, identically-named components may be implemented differently from one another.

Document parser 218a, 218b may identify one or more components of the file. For example, if the file is a patent, document parser 218a, 218b may be configured to perform one or more character analysis processes to identify a unique identifier (e.g., patent number, publication number, filing date), the patent title, the abstract, and the claims. In some embodiments, document parser 218a, 218b may identify independent and dependent claims. In some embodiments, document parser 218a, 218b may preprocess received files. For example, document parser 218a, 218b may convert a PDF file or Microsoft Word document to an XML document.

Once the document parser 218a, 218b has identified one or more components of the file the semantic encoder 220a, 220b may create a vector representation of the components, for example, using a deep neural network encoder. The deep neural network encoder may be configured to numerically capture the semantic meaning of the text of the file. For example, the semantic encoder 220a, 220b may convert textual information (e.g. title, abstract, claims) into a numeric, mathematical representation of that text in the form of a vector. Once the text is converted into a representative vector the text may be compared to other text converted in the same way to determine the similarity between documents.

Figure 2B:
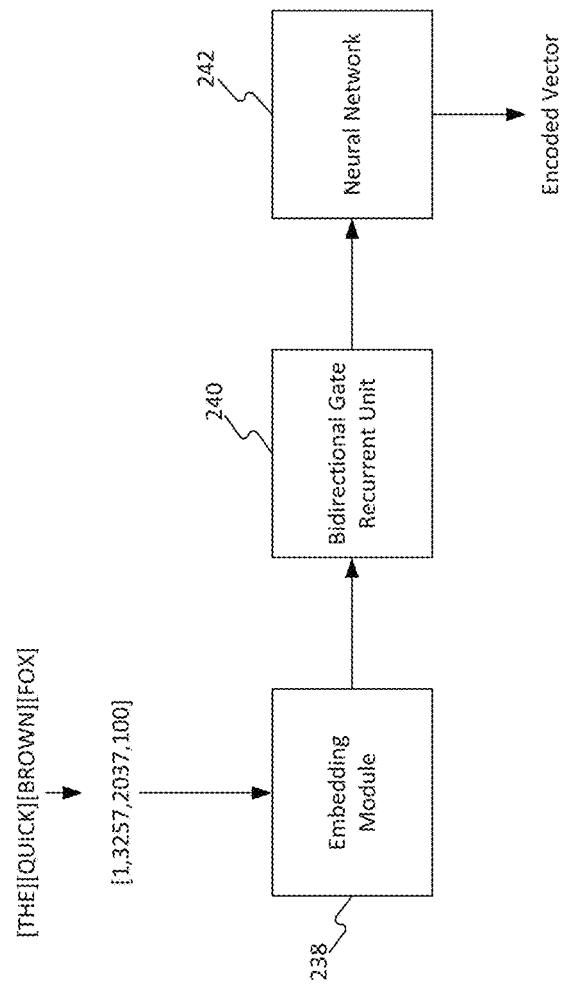
FIG. 2B is a process diagram of an exemplary semantic encoder, in accordance with disclosed embodiments.

An example of a semantic encoding process 236 is illustrated in FIG. 2B. Semantic encoder 220a, 220b may transform a series of words (e.g., the text of an input document) into a vector where each position in the vector has a value representing the frequency of the word in the corpus of documents (e.g., the documents stored in prior art database 206. For example, let a textual sentence be "The quick brown fox." Semantic encoder 220a, 220b may evaluate each word of the series to generate a vector. Assuming a vocabulary of 80,000 words, [THE] [QUICK] [BROWN] [FOX] may have a corresponding integer vector of [1, 3257, 2037, 100]. The 1 may correspond to "the", 3257 corresponds to "quick," and so forth, such that the 1 corresponding to "the" means that it is the most frequent word in the corpus and the 3257 means that 'quick' is the 3257th most frequent word in the corpus. In some embodiments, the vocabulary may be a list of words appearing at least once in the corpus of documents. In other embodiments, the vocabulary may be based on, for example, a reference work (e.g., the Oxford English Dictionary), one or more technical or scientific dictionaries, etc.

Embedding module 238 may be configured to generate a matrix of 256 rows and 80,001 columns. There may be more or fewer rows depending on the intended application and/or desired speed of the process. The number of rows may refer to the number of words analyzed. For example, 256 may correspond to the first 256 words of the claims of a patent. The number of columns may correspond to the assumed vocabulary with an additional first column for words that are found that are not in the vocabulary, or "out of vocabulary" words. Thus column 2 may represent the word in the sentence that is most frequently used throughout the corpus of documents and so on.

In some embodiments, the row represents the number position of the word in the text. For example, for the word "the" embedding module 238 would store a 1 at row 1, column 2 of the 256 by 80,001 matrix, indicating that "the" is the first word in the sentence (corresponding to row 1) and is the most popular word (corresponding to column 2).

The bidirectional gated recurrent unit 240 may "read" the sentence forwards and backwards to create a matrix with 512 rows (twice the number of rows in the matrix generated by embedding module 238) and 80,001 columns. Neural network 242 may translate the matrix into a final vector for use in similarity scoring. In some embodiments, the width of the float stored at each position within the final vector may be determined based on machine learning to generate an optimal width.

The syntactic encoder 222a, 222b may create a vector representation of the file components identified by document parser 218a, 218b by using a term frequency-inverse document frequency (TF-IDF) encoder. The syntactic encoder 222a, 222b may be configured to capture the syntactic meaning of the text. The syntactic encoder 222a, 222b may convert textual information (in the example of a patent, the title, abstract, and claims) into a numeric, mathematical representation of that text in the form of a vector. Syntactic encoder 222a, 222b may, for example, parse the file text to identify and remove "stop words" (e.g., "and," "the," etc.) from the file. The syntactic encoder 222a, 222b may then analyze the parsed text to determine how popular a word is in a document. A word or object's popularity in a file may refer to the number of times the word appears in a document compared to all remaining words in that document. The syntactic encoder 222a, 222b may also determine the rarity of a word or object. For example, the rarity may be the number of times a word appears in a file compared to how many files the word appears in the corpus of files.

In some embodiments, a graph builder 224a, 224b may process the file in order to store the file information in a knowledge graph database. The knowledge graph database may store file information in a graph data structure. An exemplary method for generating a knowledge graph is discussed in further detail with respect to FIGS. 3A and 3B.

In some embodiments, prior art database 206 may store vector data, document data, and knowledge graph data. In some embodiments, exceptions may be maintained in an exception data store. The exception data store may be part of prior art database 206. Exception data may be generated, for example, when document parser 218a, 218b cannot identify one or more components in a file. In another example, an exception may be generated when a counterpart to a native language file cannot be located.

In some embodiments, vector data from the batch module 214 as well as vector data from the ongoing module 216 that is not exception data is stored in the vector data store. Document data from the batch module 214 and document data from the ongoing module 216 that is not exception data may be stored in the document data store. Graph data from the batch module 214 as well as graph data from the ongoing module 216 that is not exception data is stored in the knowledge graph data store.

Prior art application 204 may include a data source 226, a translation module 228, a near real-time module 230, a scoring module 232, and an output device 234, such as a display or printer. Output device 234 may be an external device in communication with prior art system 102, e.g., via network 108. Output device 234 may be one or more of a printer, computing device, terminal, kiosk, and the like.

Prior art application 204 may be configured to receive input from a user (e.g., via client device 106) including a document with which the user would like to compare other documents to identify one or more similar documents. Prior art application may analyze the input document and search the prior art database 206 generated by prior art platform 202 to identify one or more similar documents.

Data source 226 may receive one or more files input via a graphical user interface (GUI). For example, a GUI may be configured to receive input indicative of a file location of a document to upload to data source 226.

If the received file is in a non-native language, the file may be translated by translation module 228. Translation module 228 may be configured to operate in the same manner as translation module 212. In some embodiments, translation module 228 and translation module 212 may be the same. The file may then be processed by the near real-time module 230, which may include a graph builder (e.g., graph builder 224a, 224b), a semantic encoder (e.g., semantic encoder 220a, 220b), a syntactic encoder (e.g., syntactic encoder 222a, 222b) and a document parser (e.g., document parser 218a, 218b).

As described above with reference to prior art platform 202, a document parser may identify one or more components of the file. Once the document parser has identified those components of the file, the graph builder may process the text of the file in order to store the file information in a knowledge graph database. The file information may be uploaded to the knowledge graph data store in the prior art database 206. A semantic encoder may create a vector representation of the components from the document parser using a deep neural network encoder that captures the semantic meaning of the text. A syntactic encoder may create a vector representation of those components from the document parser using a term frequency-inverse document frequency (TF-IDF) encoder that captures the syntactic meaning of the text.

In some embodiments, when near real-time module 230 has completed processing, scoring module 232 may ingest file data and execute several processes. First, scoring module 232 may run a query of the prior art database 206. Query data may be returned in the form of files that are the most semantically similar and the most syntactically similar to the received file. Query data may also return files that are adjacent the received file in the knowledge graph. In some embodiments, similarity may be determined using cosine, Pearson correlation coefficient, or Jaccard index. The number of files returned in the query data may be a parameter. Once the three groups (semantic, syntactic, and graphical) of similar patents are returned to the scoring module 232, an ensemble process may combine the results to generate an optimal answer set of similar files.

The ensemble process may use a voting algorithm to consolidate the lists of files from the semantic, syntactic, and graph processes. For example, if a file appears in one process's output, that occurrence contributes votes equal to the inverse rank of where the file appears in that process' list. The votes may be accumulated for each unique file and the top files are returned as the answer set ranked by the number of votes each file received. In some embodiments, prior art application 204 may receive, from a user interface, a desired number of results. Thus, prior art application 204 may return a list having the input number of results. In some embodiments, one or more of the processes' vote contributions may be weighted. For example, if the semantic vector is determined to be a more accurate predictor of similarity for a particular document type, the semantic process's votes may have a higher weight than the syntactic and graph processes.

In some embodiments, scoring module 232 may include a filtering rules process. The filtering rules process may apply one or more filters or algorithms to the final answer set based on user input. For example, a user may specify rules to constrain the answer set. In the example of a patent prior art search, the user may apply a filtering rule to have prior art application 204 fetch a Chinese counterpart application of each application in the final answer set.

Finally, once the scoring module 232 has completed processing, the answer set may be rendered to the user in a display or printed on a peripheral printer, e.g., output device 234. For example, the answer set may be presented to the user as a list, a chart, a table, a graphical display, etc. The answer set may include one or more of document identifiers (e.g., a patent number), document titles, hyperlinks to the one or more documents of the answer list, etc.

Figure 3A:
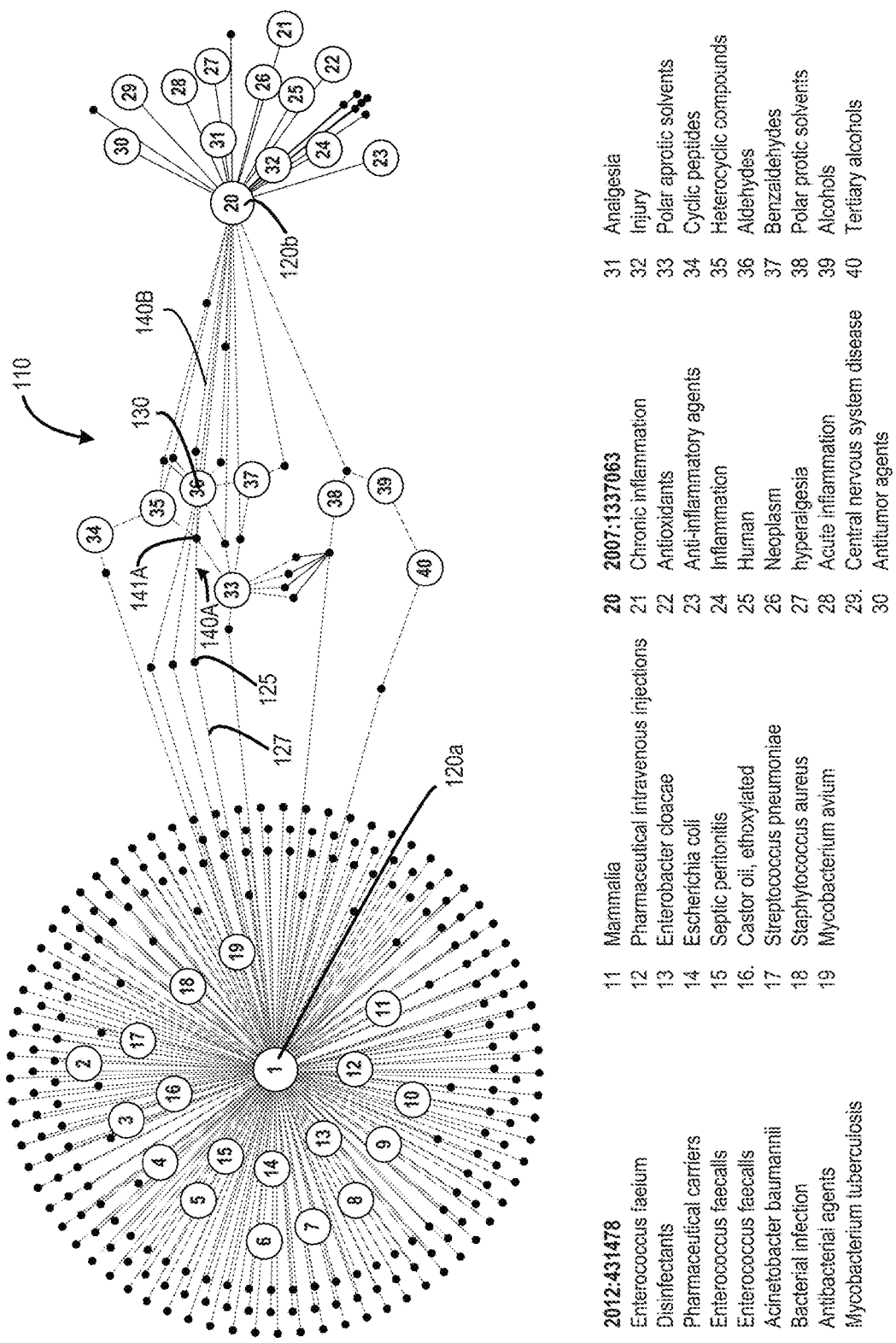
FIG. 3A is an exemplary node-edge graph, in accordance with disclosed embodiments.
Figure 3B:
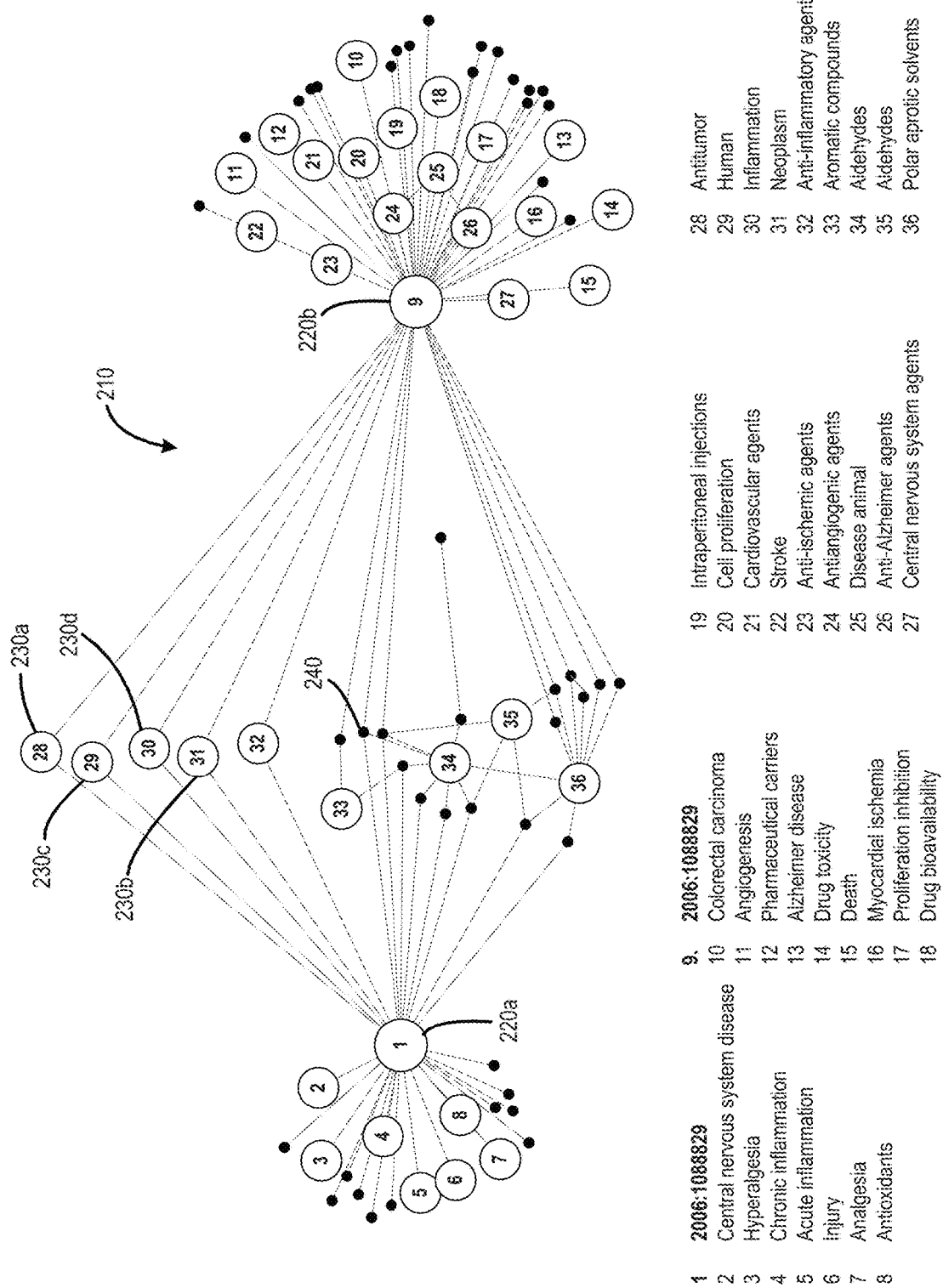
FIG. 3B is an exemplary node-edge graph, in accordance with disclosed embodiments.

FIGS. 3A and 3B describe methods of knowledge graph generation. For example, these methods may be used by graph builder 224a, 224b to generate one or more knowledge graphs. In some embodiments, a knowledge graph may comprise interconnected scientific topics, roles, and nomenclature related to scientific information found in patents, non-patent literature, and other documents. Scientific topics and roles provide for a greater understanding of documents by describing, for example, in a sentence or less the use of, for example, a new substance, compound, or idea. Roles may provide information of how a substance and/or idea may be used and/or in what type of capacity it may be used. In some embodiments, human-curated information can serve as a mechanism to interconnect documents, such as patents and non-patent literature. Curated information may be recast as an interconnected multi-relational heterogeneous network and modeled as a knowledge graph. In some embodiments, the scientific documents, roles, and nomenclature may be generated automatically using one or more machine learning algorithms trained on a training set of patents and/or scientific literature.

In some embodiments, a knowledge graph may be built using human- or computer-curated scientific content, which may be used to make connections between documents. The structure and shape (topology) of the interconnected network may be characteristic of document relatedness and may provide a definition of document similarity specified by the curator. Thus, documents that are determined to be similar based on shared topology and/or characteristics of technical similarity may be presented together in a knowledge graph.

In some embodiments, document connections in the knowledge graph may comprise chemical topics and substance-related information. Additional information may be used to score document relatedness, such as the natural distribution of connected topics and substances in the entire knowledge graph. For instance, the degree to which a given scientific topic will influence the similarity score may be based on its pattern of connectivity within the knowledge graph. In an embodiment, the disclosed systems and methods may be refined by substructure searching, cheminformatics techniques, citations, organizations, authors, and other techniques and categories. The knowledge graph may be used instead of or in conjunction with artificial intelligence techniques such as neural embeddings to identify related documents. For example, as described above, a knowledge graph may be used in conjunction with semantic and syntactic similarity and may provide a complimentary representation of document similarity.

FIG. 3A is an exemplary knowledge graph 110 illustrating a network structure representing relationships between two patent documents represented by shapes 120a, 120b. These relationships may be established using, for example, human curation. Substances, indicated in knowledge graph 110 as, for example, shape 125, may be connected to the document discussing the substance (e.g., patent document 120a) using connection 127. In the exemplary network structure of FIG. 3A, the two patent documents 120a, 120b are not directly related to each other (i.e., they share no directly connected topics or substances). Instead, indirect connections 140a, 140b may be indicated in the knowledge graph 110, allowing the two documents 120a, 120b to be connected through intermediate topic/concepts, such as "Aldehydes," indicated with shape 130. A direct connection between documents may be a connection with one intervening substance or concept. In this example, because the concept Aldehyde 130 is not directly connected to document 120a but instead has substance 141A and substance 125 between itself and document 120a. Document 120b is indirectly connected to document 120a through the concept Aldehydes 130.

FIG. 3B is another exemplary knowledge graph 210 illustrating a network structure representing relationships between two patent documents represented by shapes 220a, 220b. In this example, the two patent documents 220a, 220b share direct connections with multiple concepts and substance-related information (e.g., antitumor agents 230a, neoplasm 230b, human 230c, inflammation 230d, and substance 240). A measure of similarity between the two patent documents may be based on the number of shared concepts, substance-related information, or other scientific information connecting the patent documents together using direct connections or, in some embodiments, any connections. For example, document 220a and 220b may have shared concepts score: 0.2; disease association: 0.1; shared substance information: 0.3, yielding a similarity score of 0.6. Document 220a and 220c (not shown) may have shared concepts score 0.0; disease association: 0.0; shared substance information: 0.1, yielding a similarity score of 0.1. The similarity scores may be determined using cosine, Pearson correlation coefficient, or Jaccard index. In some embodiments, similarity may be measured from 0 to 1 where 0 indicates no similarity between the documents and 1 indicates that the documents are completely similar.

Figure 4A:
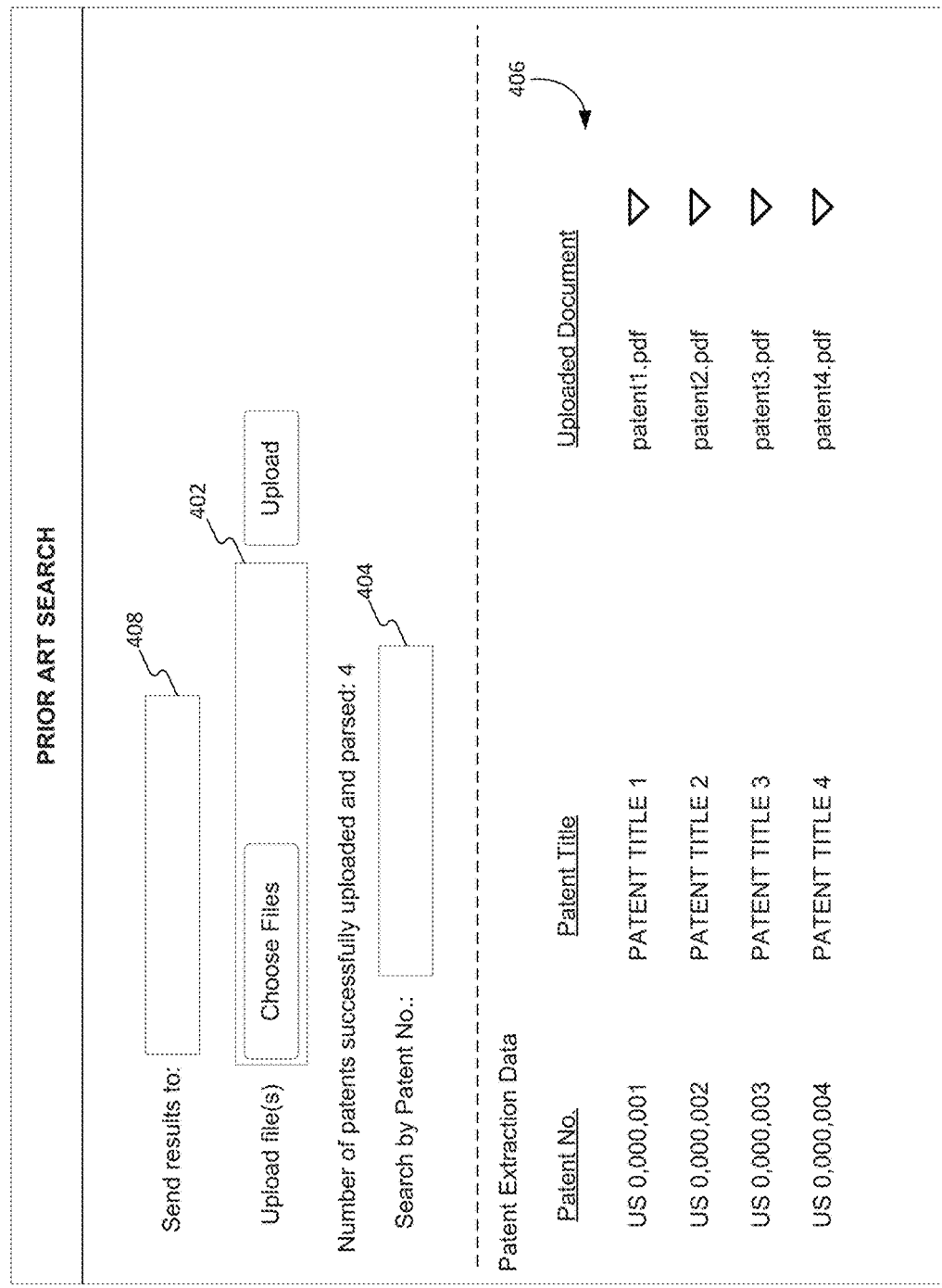
FIG. 4A is an exemplary graphical user interface for searching a prior art database, in accordance with disclosed embodiments.

FIG. 4A is an exemplary GUI 400 configured to receive user input to prior art application 204. GUI 400 may be configured to receive user inputs and provide data to a user (e.g., a patent examiner or user operating client device 106).

GUI 400 may receive a file location of a document, e.g., at input field 402. Data source 208 and/or data source 226 may be configured to receive the document identified in input field 402. In other embodiments, a user may input a patent number at field 404. The prior art system may be configured to query one or more third-party databases to retrieve the document associated with the input patent number. Once one or more documents have been uploaded, GUI 400 may present a list 406 of the uploaded documents. These uploaded documents are the documents for which the user wishes to find similar documents, e.g., from prior art database 206.

In some embodiments, prior art application 204 may include functionality to provide an alert to the user when the search process has finished running. In other embodiments, prior art application may generate a document (e.g., a text file, spreadsheet, Microsoft Word document, etc.) containing the search results. The user may input an email address (e.g., via input box 408) to which the progress alert(s) and/or output list of results may be sent. In other embodiments, the input box 408 may be configured to receive a location to which to save a file containing the output results.

FIG. 4B is an exemplary GUI 410 configured to provide the output of prior art application 204 to a user, e.g., via client device 106.

GUI 410 may output the ranked list of documents identified by scoring module 232 in a results window 412. The results window 412 may display the identified target patent, e.g., the patent identified as being similar to the patent input via GUI 400. Result window 412 may display information associated with each patent including, for example, patent number, similarity score, title, and DOCDB patent family number. In some embodiments, a user may, for example via GUI 400, specify which data to be displayed in the result window 412. For example, other data returned by prior art application 204 may include prosecution status, last action mailing date, filing date, and the like. In some embodiments, the GUI 410 may include selectable links to each document listed in the results.

In some embodiments, a user may filter the results by using a filtering tool 414. For example, the results may be filtered by one or more characteristics such that only those results with the specified characteristics are displayed. GUI 410 may also include a sorting tool 416 such that a user may sort the results, e.g., by patent number, CPC, country, relevance, etc.

Figure 5:
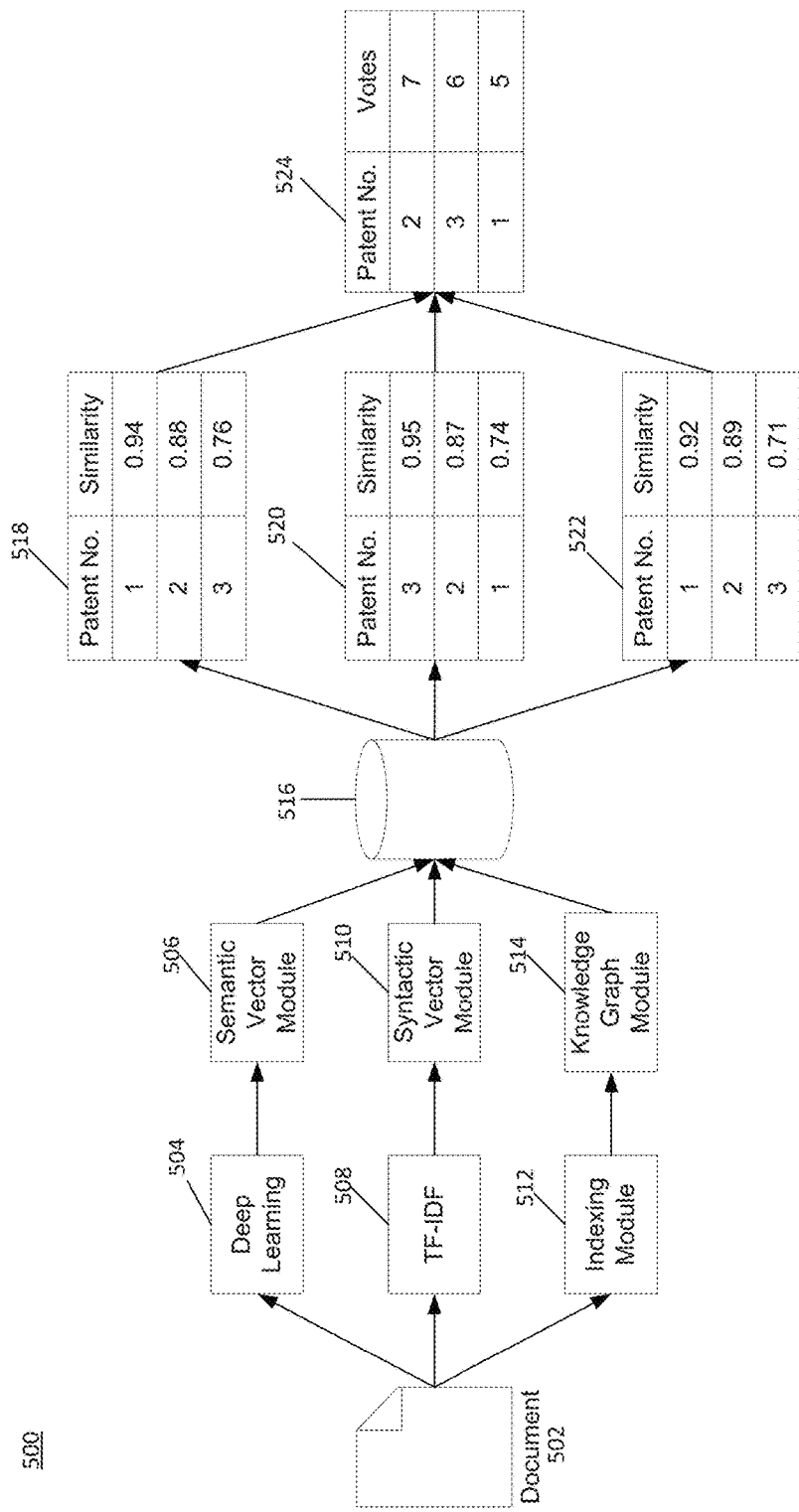
FIG. 5 is an illustration of an example of searching a prior art database, in accordance with disclosed embodiments.

FIG. 5 is a flowchart of an exemplary process 500 for performing a prior art search using prior art system 102. Real-time application 204 may receive a document 502. The document 502 may be received at data source 226 and may be uploaded by the user via GUI 400.

As previously described with reference to FIG. 2A, the document 502 may be processed by near real-time module 230. One or more deep learning encoders 504 may be configured to cause a semantic vector module 506 for document 502 to generate a semantic vector for document 502. A TF-IDF encoder 508 may be configured to cause a syntactic vector module 510 to generate a syntactic vector for document 502. In some embodiments, one or more machine learning algorithms may be applied to document 502 to generate or identify one or more document characteristics. The document may be indexed and/or tagged at index module 512 based on these characteristics. Knowledge graph module 514 may upload document 502 into a knowledge graph, e.g., a knowledge graph includes a corpus of patent documents based on the one or more characteristics. For example, the characteristics may be used by knowledge graph module 514 to determine one or more similar documents. A node representing the document 502 may be connected to the similar documents based on the number of shared characteristics.

These metrics (the semantic vector, the syntactic vector, and the knowledge graph) may be used to query prior art database 516 to identify one or more similar documents. In some embodiments, because the document properties have been numerically quantified, a similarity algorithm may be applied to the vectors of each document in prior art database 516 and document 502. A similarity algorithm may be defined by, for example:

$$\text{similarity} = \cos(\theta) = \frac{A \cdot B}{\|A\| \|B\|}$$

Other algorithms or similarity measures may also be applied. For example, the similarity may be determined using a Pearson correlation coefficient:

$$\text{similarity} = \rho_{A,B} = \frac{\text{cov}(A, B)}{\sigma_A \sigma_B}$$

where cov(A,B) is the covariance, $\sigma_A$ is the standard deviation of A, and $\sigma_B$ is the standard deviation of B, and where A represents a vector (e.g., a semantic vector or a syntactic vector) associated with document 502 and B represents a vector associated with a document in prior art database 516.

In another embodiment, the similarity may be determined using a Jaccard index:

$$\text{similarity} = J(A, B) = \frac{|A \cap B|}{|A \cup B|}$$

A similarity based on knowledge graph 514 may be determined, for example, based on nodes (e.g., documents) adjacent to the node representing document 502. In some embodiments, the degree of similarity may be based on a number of characteristics shared directly and/or indirectly between the document 502 and its adjacent documents.

Each of the three processes (semantic, syntactic, and graph) may generate a ranked list of patents and their degree of similarity to document 502 (e.g., tables 518, 520, and 522, respectively). The results of the three processes may be combined using one or more ensemble methods or algorithms to generate a final answer set 524. The final answer set may represent a list of patents determined to be most similar to document 502. For example, with reference to table 518, Patent 1 may be assigned the highest number of votes, Patent 2 may be assigned a number of votes lower than Patent 1, and Patent 3 may be assigned the least number of votes. The votes may be tallied (e.g., by generating a sum of votes for Patent 1) such that the patent with the largest number of votes is ranked first, indicating that it is the most similar, of the prior art documents, to document 502. In some embodiments, the final answer set 524 may be output to a user via GUI 410.

Figure 6:
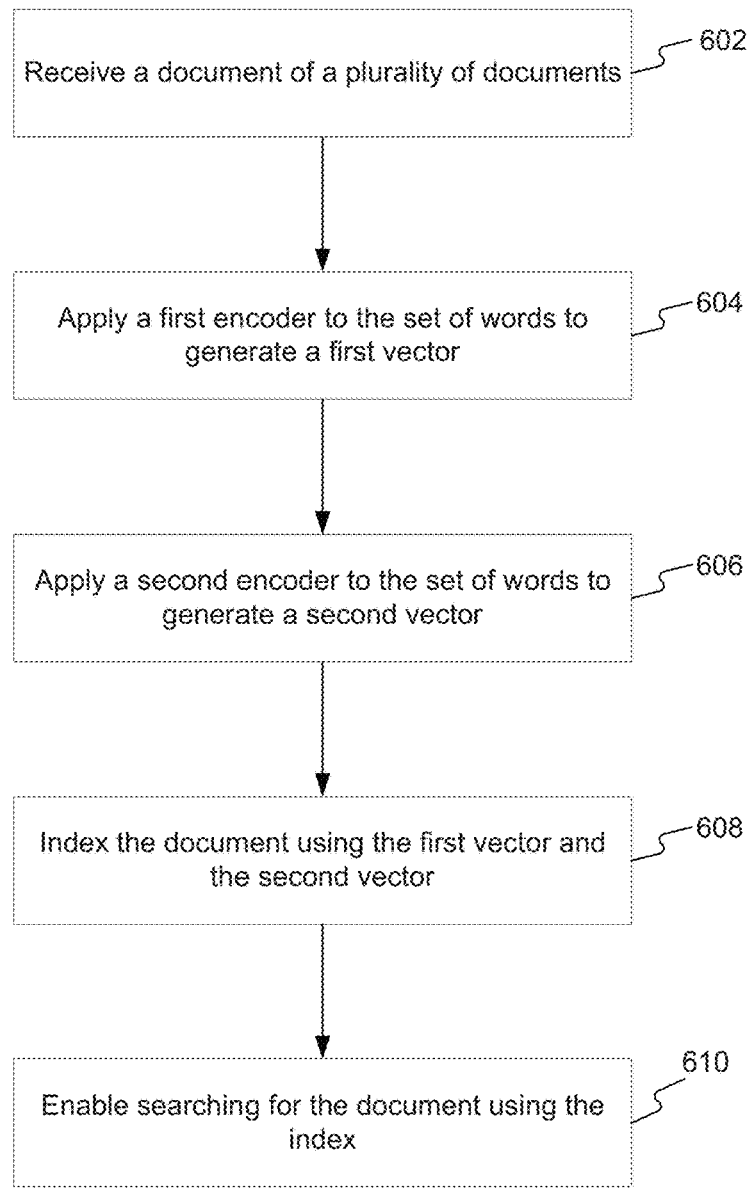
FIG. 6 is a flow diagram of an exemplary method of generating a prior art database, in accordance with disclosed embodiments.

FIG. 6 is an exemplary method 600 for generating a document database, in accordance with disclosed embodiments.

At step 602, a processing device (e.g., a processing device of prior art system 102) may receive a document of a plurality of documents, the document comprising a set of words. For example, the document may be a patent and may be one of a corpus of patent documents.

At step 604, the processing device may apply a first encoder to the set of words to generate a first vector. The first encoder may be configured to generate a semantic vector.

At step 606, the processing device may apply a second encoder to the set of words to generate a second vector. The second vector may be, for example, a syntactic vector.

At step 608, the processing device may index the document using the first vector and the second vector.

At step 610, the processing device may enable searching for the document using the index. In some embodiments, method 600 may be executed for a number of documents, and may be used to generate a document database from the generated and indexed vectors. For example, the generated database may include a number of documents where each document is associated with a semantic vector and a syntactic vector. The database may be indexed on the vector values, thereby facilitating searches for documents.

Figure 7:
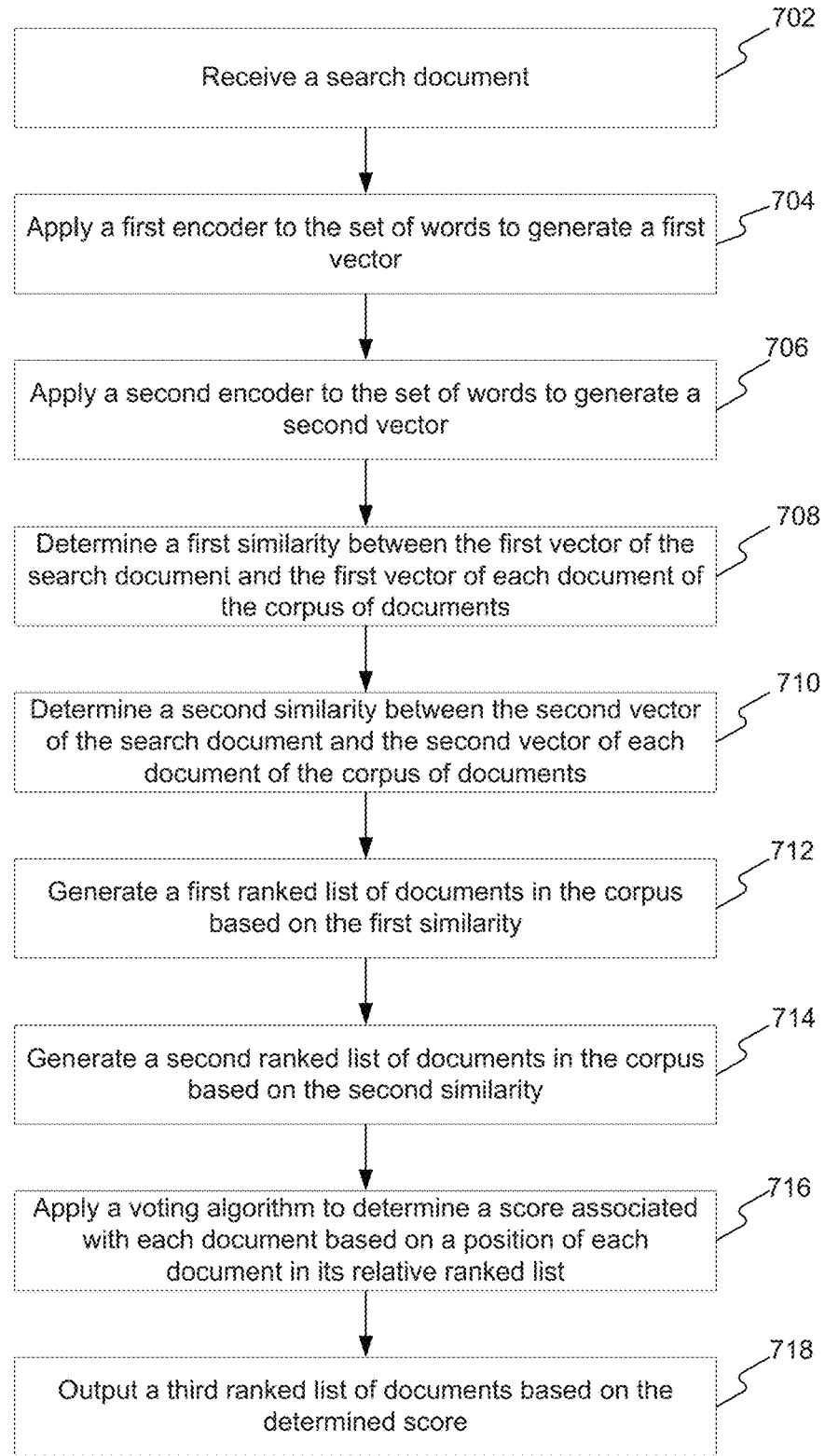
FIG. 7 is a flow diagram of an exemplary method of searching a prior art database, in accordance with disclosed embodiments.

FIG. 7 is an exemplary method 700 for retrieving a similar document from a corpus of documents.

At step 702, the processing device, e.g., at prior art application 204, may receive a search document, the search document comprising a set of words. For example, the search document may be a patent or other text-containing document.

At step 704, the processing device may apply a first encoder to the set of words to generate a first vector. The first encoder may be configured to generate a semantic vector.

At step 706, the processing device may apply a second encoder to the set of words to generate a second vector. The second vector may be, for example, a syntactic vector.

At step 708, the processing device may determine a first similarity between the first vector of the search document and the first vector of each document of the corpus of documents. For example, the processing device may apply a similarity algorithm to determine a degree of similarity between the search document and each of the documents in prior art database 206.

At step 710, the processing device may determine a second similarity between the second vector of the search document and the second vector of each document of the corpus of documents. The processing device may apply the same, or a different, similarity algorithm to the second vector associated with each document. For example, the similarity algorithm may be based on cosine, may be a Pearson correlation coefficient, or may be a Jaccard index.

At step 712, the processing device may generate a first ranked list of documents in the corpus based on the first similarity. For example, the ranked list may have a document yielding a similarity of 1 (the highest similarity) at the top position, and a document yielding a similarity of 0 (the lowest similarity) at the lowest position.

At step 714, the processing device may generate a second ranked list of documents in the corpus based on the second similarity. The ranked list may include a list of documents ranked from most to least similar to the search document as described above.

At step 716, the processing device may apply a voting algorithm to determine a score associated with each document based on a position of each document in its relative ranked list. The voting algorithm may be configured to apply a score to each ranked patent based on that patent's position in the first and second lists respectively. In some embodiments, the processing device may generate a single list or more than two lists. The number of lists of documents may be based on, for example, the number of types of similarity comparisons. For example, two lists may be generated in a process using semantic vector comparison and syntactic vector comparison. In another example, as shown in FIG. 5, three lists may be generated during process 500, which generates three similarity measurements for each of the semantic vector, syntactic vector, and knowledge graph.

As an example, given two ranked lists each having three documents, with the most similar document at the first position, the document at the first position may be assigned three votes. The document at the second position may be assigned two votes and the document at the third position may be assigned 1 vote. Thus, if a Document A is ranked first in one list and third in the other list, its final score will be four. A Document B ranked second in one list and first in the other list will have a final score of five and a Document C will have a final score of three. Thus the final ranked list of documents may yield: Document B, Document A, and Document C, which are ordered from most to least similar.

At step 718, the processing device may output a third ranked list of documents based on the determined score. The third list may be generated by combining the scores associated with each document in each list and ranking the documents from high-score to low-score. The ranked list may be output to a user, for example, via GUI 410.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for retrieving a similar document from a corpus of documents, the method comprising:
   receiving a search document, the search document comprising a set of words;
   applying a first encoder to the set of words to generate a first vector;
   applying a second encoder to the set of words to generate a second vector;
   determining a first similarity between the first vector of the search document and the first vector of each document of the corpus of documents;
   determining a second similarity between the second vector of the search document and the second vector of each document of the corpus of documents;
   generating a first ranked list of documents in the corpus based on the first similarity;
   generating a second ranked list of documents in the corpus based on the second similarity;
   applying a voting algorithm to determine a score associated with each document based on a position of each document in its relative ranked list; and
   outputting a third ranked list of documents based on the determined score.

2. The method of claim 1, further comprising:
   applying a model to the set of words of the search document to generate one or more tags associated with the search document.

3. The method of claim 2, further comprising:
   based on the one or more tags, updating a node-edge graph associated with the corpus of documents with the search document; and
   generate a ranked list of documents sharing an edge with the search document.

4. The method of claim 3, wherein the score is based, in part, on the node-edge graph.

5. The method of claim 1, wherein the first encoder comprises a neural network encoder.

6. The method of claim 1, wherein applying the second encoder comprises parsing the set of words and removing occurrences of a stop word from the set of words, thereby generating a subset of words.

7. The method of claim 6, further comprising:
   determining the number of times each of the subset of words appears in the subset of words; and
   determining a rarity of each of the subset of words.

8. The method of claim 7, wherein the rarity comprises a number of times a word appears in the search document compared to a number of times the word appears in the corpus of documents.

9. The method of claim 1, further comprising:
   receiving a filtering rule comprising a condition;
   filtering the third ranked list based on the condition; and
   outputting a fourth ranked list.

10. A computer program product comprising a non-transitory computer readable medium having a computer readable program embodied therein, wherein the computer readable program, when executed on a computing device, causes the computing device to:
    receive a search document, the search document comprising a set of words;
    apply a first encoder to the set of words to generate a first vector;
    apply a second encoder to the set of words to generate a second vector;
    determine a first similarity between the first vector of the search document and the first vector of each document of the corpus of documents;
    determine a second similarity between the second vector of the search document and the second vector of each document of the corpus of documents;
    generate a first ranked list of documents in the corpus based on the first similarity;
    generate a second ranked list of documents in the corpus based on the second similarity;
    apply a voting algorithm to determine a score associated with each document based on a position of each document in its relative ranked list; and
    output a third ranked list of documents based on the determined score.

11. The computer-readable medium of claim 10, wherein the program further causes the computing device to:
    apply the first encoder using a semantic vector module comprising a deep learning encoder;
    apply the second encoder using a syntactic module configured to: determine a number of times each of the set of words appears in the search document,
    determine a number of times each of the set of words appears in the corpus of documents, and
    generate the second vector representing a comparison of the number of times each word appears in the document to the number of times each word appears in the corpus of documents; and
    apply a knowledge graph module configured to update a knowledge graph with a node comprising the search document.

* * * * *